United States Patent
Matsumoto

(10) Patent No.: US 11,893,513 B2
(45) Date of Patent: Feb. 6, 2024

(54) SYSTEM, METHOD, AND NON-TRANSITORY STORAGE MEDIUM FOR PROVIDING AN ESTIMATED RESULTS OF AN INPUT INCLUDING A PLURALITY OF PARAMETERS USING A LEARNING MODEL

(71) Applicant: CANON KABUSHIKI KAISHA, Tokyo (JP)

(72) Inventor: Kiyonori Matsumoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 243 days.

(21) Appl. No.: 17/005,817

(22) Filed: Aug. 28, 2020

(65) Prior Publication Data
US 2021/0065061 A1 Mar. 4, 2021

(30) Foreign Application Priority Data
Sep. 4, 2019 (JP) ................... 2019-161015

(51) Int. Cl.
*G06N 5/045* (2023.01)
*G06N 20/00* (2019.01)
*G06F 3/0482* (2013.01)

(52) U.S. Cl.
CPC ............. *G06N 5/045* (2013.01); *G06N 20/00* (2019.01); *G06F 3/0482* (2013.01)

(58) Field of Classification Search
CPC ............ G06N 20/00; G06N 3/02; G06N 3/08; G06N 3/088; G06N 20/10; G06N 20/20; G06F 3/0482; G06F 3/04847
See application file for complete search history.

(56) References Cited

U.S. PATENT DOCUMENTS

| | | | |
|---|---|---|---|
| 10,114,884 B1 * | 10/2018 | Valensi | G06F 16/285 |
| 2014/0122486 A1 * | 5/2014 | Simard | G06N 20/00 707/737 |
| 2017/0039470 A1 | 2/2017 | Hirayama | |
| 2018/0322406 A1 * | 11/2018 | Merrill | G06N 20/20 |
| 2019/0294920 A1 * | 9/2019 | Kandaswamy | G06V 10/75 |
| 2020/0012962 A1 * | 1/2020 | Dent | G06F 9/5011 |
| 2020/0034750 A1 * | 1/2020 | Ritter | G06N 20/00 |

FOREIGN PATENT DOCUMENTS

JP 2014081878 A 5/2014
JP 6208259 B2 10/2017

* cited by examiner

*Primary Examiner* — Roberto Borja
(74) *Attorney, Agent, or Firm* — ROSSI, KIMMS & McDOWELL LLP

(57) ABSTRACT

A system provides an estimated result of an input including a plurality of parameters using a learning model, and the system is configured to provide information necessary to change an estimated result with regard to one parameter among the plurality of parameters, and set a condition for information with regard to at least one parameter among the plurality of parameters, wherein the condition is a condition for not providing some information regarding a parameter which is a target of the set condition as the information necessary to change the estimated result.

7 Claims, 12 Drawing Sheets

FIG. 8

BROWSER

LOAN EXAMINATION

NAME: YAMADA TARO

ADDRESS: OTA-KU TOKYO

SEX: ◉ MALE ◯ FEMALE

AGE: 30

ESTIMATED BORROWING AMOUNT: ¥ 10,000,000

INCOME: ¥ 3,000,000

SAVINGS: ¥ 500,000

OTHER COMPANY BORROWING AMOUNT: ¥ 30,000,000

EDUCATIONAL BACKGROUND: UNIVERSITY DEGREE

EXECUTE ESTIMATION — 801

SYSTEM, METHOD, AND NON-TRANSITORY STORAGE MEDIUM FOR PROVIDING AN ESTIMATED RESULTS OF AN INPUT INCLUDING A PLURALITY OF PARAMETERS USING A LEARNING MODEL

BACKGROUND OF THE INVENTION

Field of the Invention

The present invention relates to a system, a method, and a non-transitory storage medium providing an estimated result obtained through machine learning.

Description of the Related Art

In recent years, in order to efficiently utilize big data held by companies, big data processing has been performed by AI using machine learning at various companies. Estimation processes using machine learning are generally black boxes. In many cases, even people who generate machine learning models do not know how internal processes are performed. In such situations, in order to actively utilize machine learning systems, it is necessary for people to be able to understand results of machine learning, that is, to enhance an explanatory responsibility of estimated results of the machine learning. Japanese Patent No. 6208259 discloses a system and a scheme for extracting explanatory variables of results from collected data.

For example, there are loan examination systems that determine whether to loan money to applicants who apply for loans. When a certain applicant is denied a loan in a loan examination, the applicant wants to know why the loan was denied. In general, since meanings of data are not determined in machine learning systems, for example, when a result "would be approved if its age were 5 years younger" is obtained, this explanation may be presented to the applicant. However, reversing the age of the applicant is unfeasible with a current technology, and it is meaningless to present this explanation to the applicant. It is difficult for the applicant to accept such a reason for denial when such unfeasible reasons are presented as explanations, and it is difficult for the one presenting the explanation to explain it.

On the other hand, when a result "would be approved if income increased 1 million yen more" is obtained, this state can be feasible in the future for the applicant. Therefore, it is easy for the applicant to accept this explanation as the reason for denial and it is easy for the one presenting the explanation to explain it.

In the invention disclosed in Japanese Patent No. 6208259, a plurality of explanatory variables contributing to objective variables are intended to be extracted. However, adequate explanations that are easy for people to understand have not been considered.

SUMMARY OF THE INVENTION

An objective of the present invention is to provide a system capable of providing an adequate explanation for an estimated result of machine learning.

According to an embodiment of the present invention, a system that provides an estimated result of an input including a plurality of parameters using a learning model, the system comprising: a memory storing instructions, and a processor that is capable of executing the instructions stored in the memory causing the system to: provide information necessary to change an estimated result with regard to one parameter among the plurality of parameters, and set a condition for information with regard to at least one parameter among the plurality of parameters, wherein the condition is a condition for not providing some information regarding a parameter which is a target of the set condition as the information necessary to change the estimated result.

Further features of the present invention will become apparent from the following description of exemplary embodiments with reference to the attached drawings.

BRIEF DESCRIPTION OF THE DRAWINGS

FIG. 8 is a diagram illustrating a UI of a parameter inputting screen according to Example 1 of the present invention.

DESCRIPTION OF THE EMBODIMENTS

Hereinafter, modes for carrying out the present invention will be described in detail with reference to the drawings.

Hereinafter, a system that estimates a result of a loan examination will be described as an example of the present invention. However, the present invention is not limited to the system that estimates a result of a loan examination.

Example 1

Figure 1:
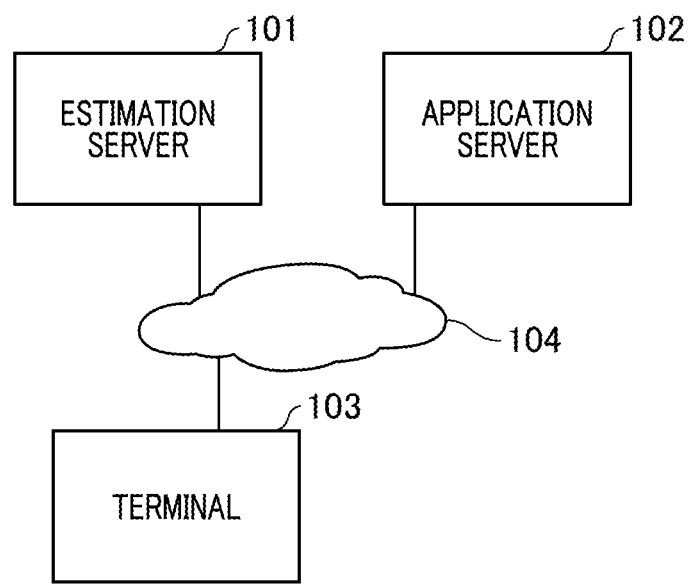
FIG. 1 is a block diagram illustrating a configuration of a system according to Example 1 of the present invention.

FIG. 1 is a block diagram illustrating a configuration of a system according to Example 1 of the present invention.

The system includes an estimation server 101, an application server 102, a terminal 103, and a network 104. The estimation server 101 learns and estimates a loan examination result using machine learning. The application server 102 serves as a function of a management system of a company that manages an estimated result of a loan or an achievement or the like of a loan and performs a loan examination. The terminal 103 performs an exchange with the estimation server 101 or the application server 102 via the network 104 to provide various functions to a user. The terminal 103 is, for example, a so-called PC. PC is an abbreviation for "personal computer." The network 104 is a so-called communication network. The network 104 is, for example, any of an Internet, a LAN, a WAN, a telephone circuit, a dedicated digital line, an ATM or frame relay line, a cable television line, a data broadcast wireless line, or the like. For example, the network 104 is realized by combining any of a LAN such as the Internet, a WAN, a telephone circuit, a dedicated digital line, an ATM or frame relay line, a cable television line, a data broadcast wireless line, or the like. LAN is an abbreviation for "local area network." WAN is an abbreviation for "wide area network." ATM is an abbreviation for "asynchronous transfer mode." The estimation server 101, the application server 102, and the terminal 103 are connected to each other via the network 104 to be able to exchange information.

Figure 2:
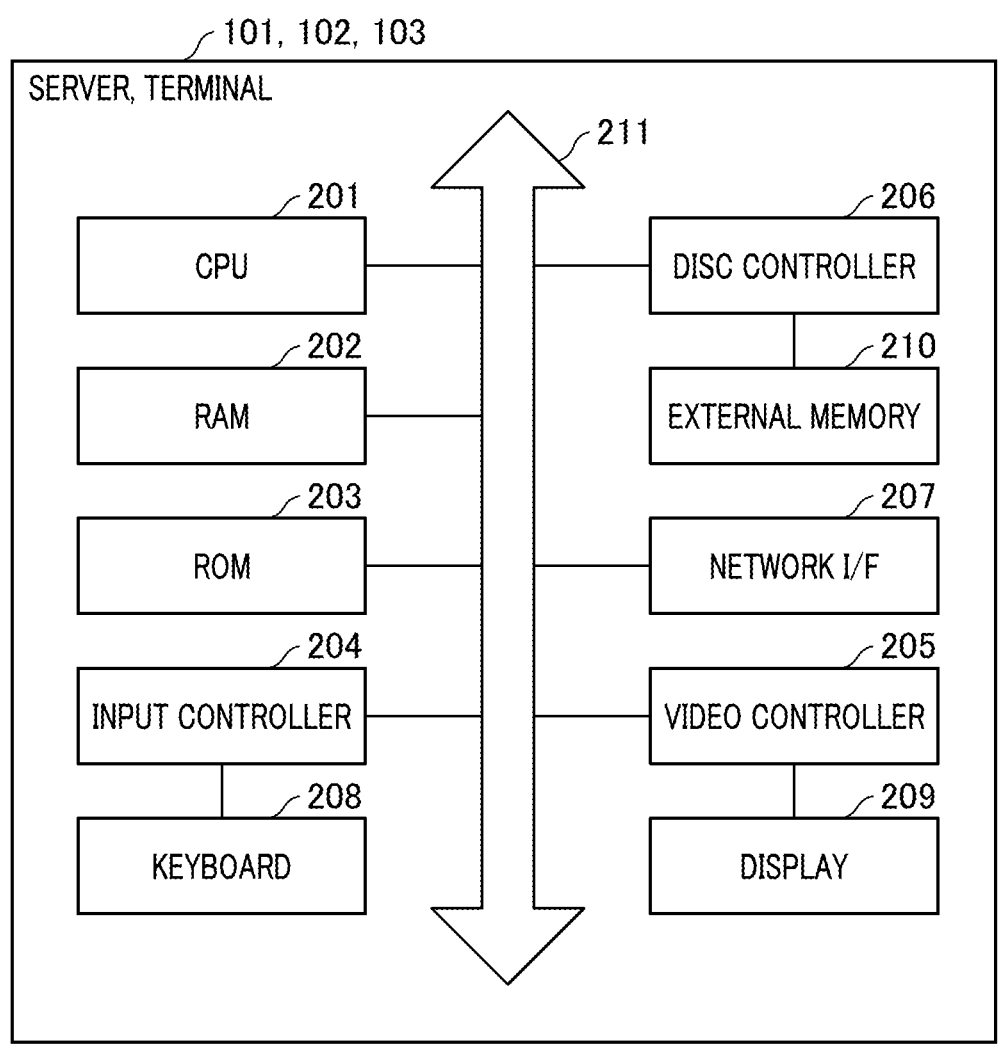
FIG. 2 is a block diagram illustrating a hardware configuration of an estimation server 101, an application server 102, and a terminal 103 illustrated in FIG. 1.

FIG. 2 is a block diagram illustrating a hardware configuration of the estimation server 101, the application server 102, and the terminal 103 illustrated in FIG. 1. Each of the estimation server 101, the application server 102, and the terminal 103 can be configured as a general information processing apparatus. An example of the information processing apparatus is a so-called PC. Of the estimation server 101, the application server 102, and the terminal 103, a plurality of apparatuses may be the same information processing apparatus.

A CPU 201 executes a program such as a program stored in a ROM 203, or an operating system (OS) or an application loaded from an external memory 210 to a RAM 202. CPU is an abbreviation for "central processing unit." ROM is an abbreviation for "read-only memory." RAM is an abbreviation for "random access memory." The CPU 201 can function as each processing unit that executes a process of each flowchart to be described below by executing a program stored in a readable storage medium such as the ROM 203 or the RAM 202. The RAM 202 is a main memory of the CPU 201 and functions as a work area or the like. The CPU 201, the RAM 202, and the ROM 203 are connected to an internal bus 211.

An input controller 204 controls an input operation from the keyboard 208 or a pointing device (a mouse, a touch pad, a touch panel, a trackball, or the like) (not illustrated). The input controller 204 is connected to the internal bus 211. A video controller 205 controls display of a display 209. The video controller 205 is connected to the internal bus 211. A disk controller 206 controls data access to an external memory 210 such as a hard disk (HD) or a flexible disk (FD) storing various kinds of data. The disk controller 206 is connected to the internal bus 211. A network I/F 207 is connected to the network 104 and performs a communication controlling process with another device connected to the network 104. I/F is an abbreviation for "interface." The network I/F 207 is connected to the internal bus 211. The configurations connected to the internal bus 211 are connected mutually via the internal bus 211.

Figure 3A:
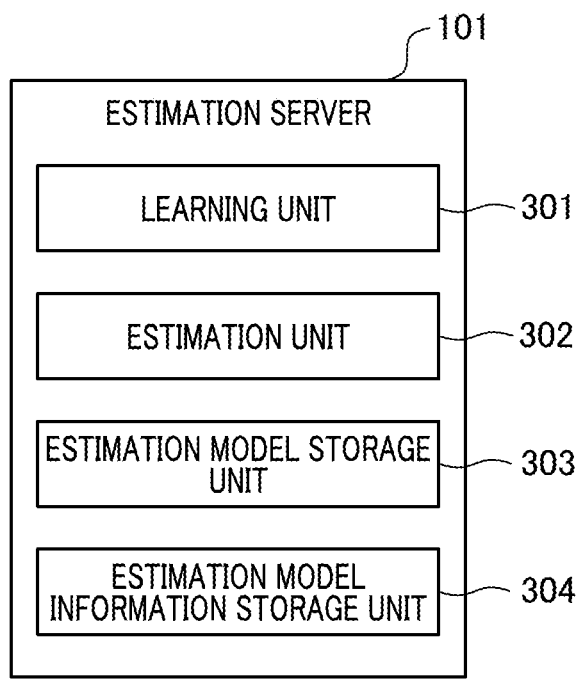
FIGS. 3A and 3B are block diagrams illustrating a functional configuration of the system according to Example 1 of the present invention.
Figure 3B:
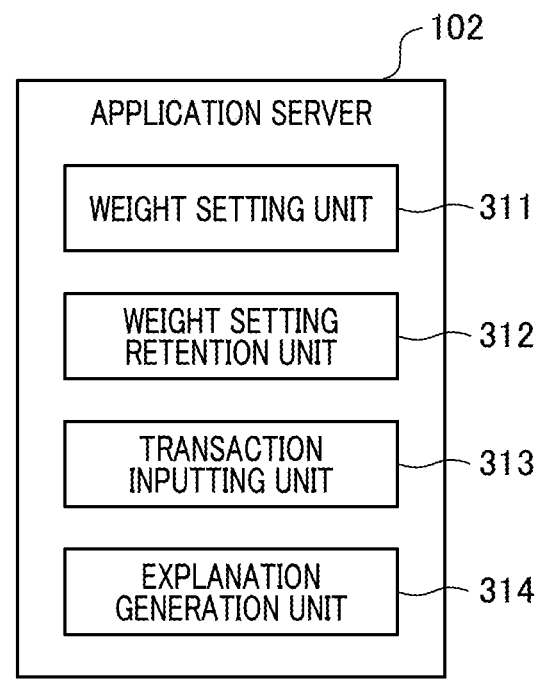

FIGS. 3A and 3B are block diagrams illustrating a functional configuration of the system according to Example 1 of the present invention. In this example, each functional block is a block of a program processed by the CPU 201 mounted as hardware.

The estimation server 101 includes a learning unit 301, an estimation unit 302, an estimation model storage unit 303, and an estimation model information storage unit 304. The learning unit 301 performs learning by machine learning to generate an estimation model. The learning unit 301 stores the generated estimation model in the estimation model storage unit 303. The estimation unit 302 generates an estimated result of a given input parameter using the estimation model stored in the estimation model storage unit 303. The estimation unit 302 stores metadata related to the generated estimation model in the estimation model information storage unit 304. Specifically, the metadata stored in the estimation model information storage unit 304 is a parameter name of an input parameter and a type of input parameter which the estimation model has. The details of the metadata will be described later.

The application server 102 includes a weight setting unit 311, a weight setting retention unit 312, a transaction inputting unit 313, and an explanation generation unit 314. The weight setting unit 311 performs a process of setting a weight which is used when a distance to be described below is calculated. The weight setting unit 311 stores an input weight setting value in the weight setting retention unit 312. The transaction inputting unit 313 receives an input for a loan examination request of a customer, that is, a loan applicant, and stores content of the input. The explanation generation unit 314 generates an explanation for an estimated result to fulfill an explanatory responsibility of the estimated result. In this example, a counterexample is presented by presenting an input parameter which is different from the estimated result and is closest and the explanatory responsibility is fulfilled by clarifying necessity to change the estimated result. The details of this process will be described later.

The functions according to this example are broadly classified into "Generating estimation model," "Setting weight," and "Displaying explanatory result." Hereinafter, each function will be described.

<Generating Estimation Model>

Figure 4:
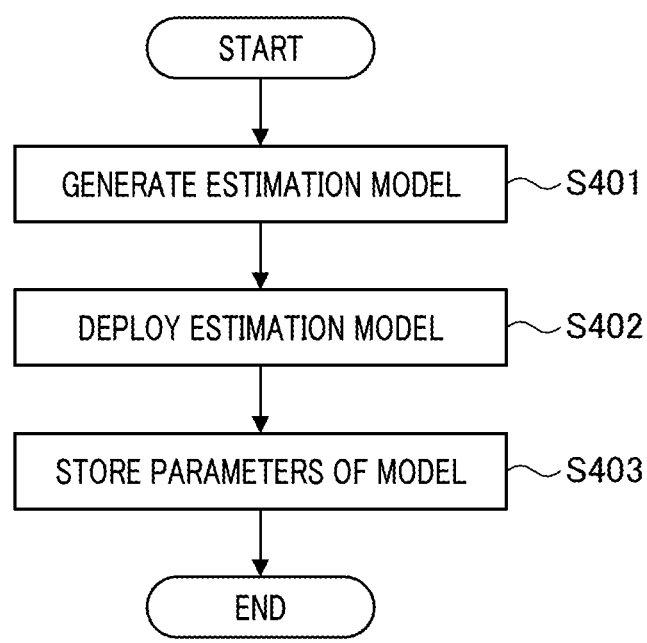
FIG. 4 is a flowchart illustrating a flow of an estimation model generation process according to Example 1 of the present invention.

FIG. 4 is a flowchart illustrating a flow of an estimation model generation process according to Example 1 of the present invention.

First, the learning unit 301 performs a learning process by machine learning to generate an estimation model (step S401). In this example, the estimation model for determining whether to approve or deny a loan is generated using information as the input data indicating approval or denial of the loan determined manually in the past. In this example, it is assumed that an output of the generated model indicates a classification result of 2-class classification and a value of 0 to 1 indicates the degree of accuracy of the classification result. For example, any estimation scheme such as the random forest may be used as long as the estimation model to be generated is an estimation model performing binary classification.

Subsequently, the learning unit 301 stores the estimation model generated in step S401 in the estimation model storage unit 303 and the estimation unit 302 sets the estimation model to be usable (step S402). Further, the learning unit 301 generates a list of input parameters used at the time of generation of the estimation model and stores the list of the input parameters in the estimation model information storage unit 304 (step S403). Table 1 is a table that shows an example of content of metadata stored in the estimation model information storage unit 304 by the learning unit 301 in step S403.

TABLE 1

| Variable name | Type | Average | Standard deviation | Distribution |
|---|---|---|---|---|
| Sex | Category | | | Male = 0.6, Female = 0.4 |
| Age | Number | 25.2 | 12.1 | |
| Income | Number | 4.55 million | 1.21 million | |

In Table 1, a variable name is the name of a variable that is input to the estimation model. In Table 1, a type is a type indicating whether a parameter input to the estimation model is category information or number information. In Table 1, an average indicates a value of an average of all data input at the time of learning. In Table 1, a standard deviation indicates a value of a standard deviation when the values of all the data input at the time of learning are assumed to be in a normal distribution. The average and the standard deviation are calculated only when the classification is a number, and are stored in the estimation model information storage unit 304. In Table 1, the distribution is information indicating how many elements of each category there are. The distribution is calculated only when the classification is the category, and is stored in the estimation model information storage unit 304. In the example of Table 1, a record of the variable name which is sex indicates that the classification is the category, the elements of the category are male and female, a ratio of male is 60%, and a ratio of female is 40%.

In this example, in the above-described flow, the estimation model is generated and it is prepared to use the estimation model. Further, in this example, the metadata of the generated estimation model is stored along with the estimation model in the estimation model information storage unit 304 to be used in processes to be described below.

<Setting Weight>

Figure 5:
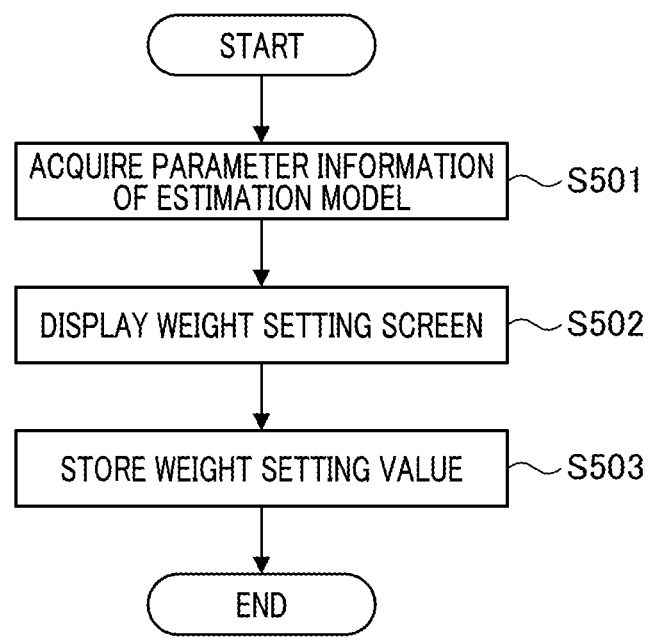
FIG. 5 is a flowchart illustrating a flow of a weight setting process according to Example 1 of the present invention.

FIG. 5 is a flowchart illustrating a flow of a weight setting process according to Example 1 of the present invention.

In this example, a weight is a value used for a user to uniquely set easiness of a change in each input parameter. For example, in this example, a certain user considers that the age easily changes since the age changes over time. Another user may consider that it is easier to increase income or savings than the age which does not change unless years pass. Therefore, in this example, the user is allowed to uniquely set the easiness of the change in each input parameter at will. The easiness of the change in each input parameter is a variable that depends on the thought of a user who handles the system. Therefore, by assigning a weight to each input parameter uniquely, it is possible to reflect the thought of the user at the time of calculation of data of which a distance is close, as will be described below.

Figure 6:
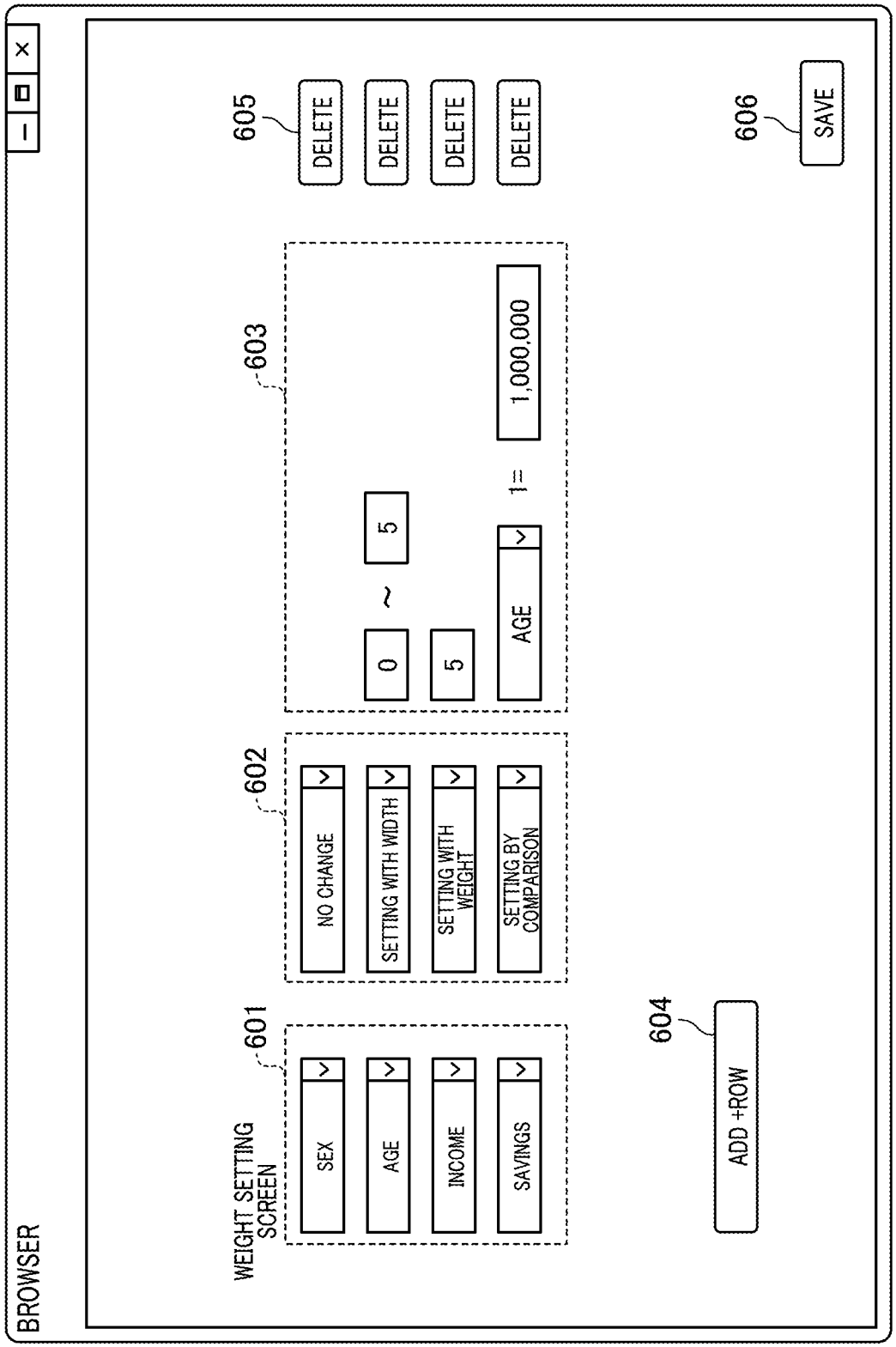
FIG. 6 is a diagram illustrating a UI of a weight setting screen according to Example 1 of the present invention.

First, when the user operates a terminal 103 to display a setting screen, the weight setting unit 311 receives the operation and acquires input parameter information of the estimation model stored in the estimation model information storage unit 304 (step S501). Thereafter, the weight setting unit 311 displays a UI for setting a weight on the terminal 103 operated to display the setting screen (step S502). The display screen is illustrated in FIG. 6. UI is an abbreviation for "user interface."

FIG. 6 is a diagram illustrating a UI of a weight setting screen according to Example 1 of the present invention. The weight setting screen of FIG. 6 is a screen which is displayed on the terminal 103 and on which a weight set by the user is input. In FIG. 6, each row indicates a weight parameter set for each input parameter. The user can select and set a weight parameter from four types of parameters, "No change" "Setting with width," "Setting with weight," and "Setting by comparison."

A drop-down 601 displays a list of the input parameters which the estimation model stored in the estimation model information storage unit 304 has when the user performs an operation. The user operates the drop-down 601 to select a target input parameter for which a weight is set.

A drop-down 602 displays a list of settable weight parameters when the user performs an operation. The weight parameters differ in accordance with a type of input parameter of the estimation model. When the type of input parameter is a number, the weight parameters can be selected and set from "No change" "Setting with width," "Setting with weight," and "Setting by comparison." When the type of input parameter is a category, the weight parameters can be selected and set from "No change and "Setting with weight." The user operates the drop-down 602 to select a weight parameter. The weight parameter is an example of a parameter with which the easiness of the change in the target input parameter is set. The easiness of the change in the input parameter is an example of adequacy of a change of the input parameter.

An input 603 is a UI and used to input the details of the weight parameter determined for each weight parameter set with the drop-down 602. The user inputs the details of the weight parameter in the input 603.

The case of the weight parameter which is "No change" means that a suggested value is output without changing a value from the input value. Therefore, in this case, nothing is displayed in the input 603.

The case of the weight parameter which is "Setting with width" means that a change in a value within a designated range is permitted. Therefore, in this case, a UI for setting a change width determined with a lower limit and an upper limit of the value to be changed is displayed in the input 603.

The case of the weight parameter which is "Setting with weight" means that it is set how much more easily a value of an input parameter is changed than those of other input parameters. Therefore, in this case, a UI for setting a magnification indicating the easiness of the change is displayed in the input 603. As the magnification is larger, it is more difficult to change the value of the input parameter.

The case of the weight parameter which is "Setting by comparison" means that it is set how much more easily the input parameter can be changed than a designated input parameter. Therefore, in this case, in addition to a drop-down for setting a comparison target parameter, how easily a value is changed with respect to 1 of the value of the comparison target parameter is set in the input 603. The example illustrated in FIG. 6 shows that a change of an age by 1 (an increase of an age by 1) has the same meaning as an increase of savings of 1 million yen. In this example, in the case of the weight parameter which is "Setting by comparison," easiness of a change in a certain input parameter is set in association with easiness of a change in another input parameter.

The weight parameter can be set for each input parameter. When the user operates a button 604 (clicks a mouse, for example), an input parameter which is a setting target of the weight parameter can be increased. When the user operates a button 605 (clicks a mouse, for example), an input parameter corresponding to the operated button 605 can be deleted from the setting target.

When the user operates a save button 606 (clicks a mouse, for example), the weight setting unit 311 receiving the operation stores a weight setting value input on the UI of FIG. 6 in the weight setting retention unit 312 (step S503).

Table 2 is a table that shows an example of content of data stored in the weight setting retention unit 312 by the weight setting unit 311 in step S503.

TABLE 2

| Id | Variable | Type | Value |
|---|---|---|---|
| cond01 | Sex | No change | |
| cond02 | Age | Setting with width | ("from": 0, "to": 5) |

TABLE 2-continued

| Id | Variable | Type | Value |
|---|---|---|---|
| cond03 | Income | Setting with weight | ("weight": 5) |
| cond04 | Savings | Setting by comparison | ("comp": "age", "value": 1000000) |

In Table 2, Id is a unique ID for each weight setting. ID is an abbreviation for identification. In Table 2, Id is information for identifying each weight setting. In Table 2, a variable designates a target variable name with which a weight is set. In Table 2, a variable is an input parameter selected in the drop-down 601 of FIG. 6. In Table 2, a type is a weight parameter selected in the drop-down 602 of FIG. 6. In Table 2, a value indicates a text string into which a setting value (a value input in the input 603 of FIG. 6) unique for each type is converted in the format of JSON. JSON is an abbreviation for "JavaScript (registered trademark) Object Notation."

[Displaying Explanatory Result]

Figure 7:
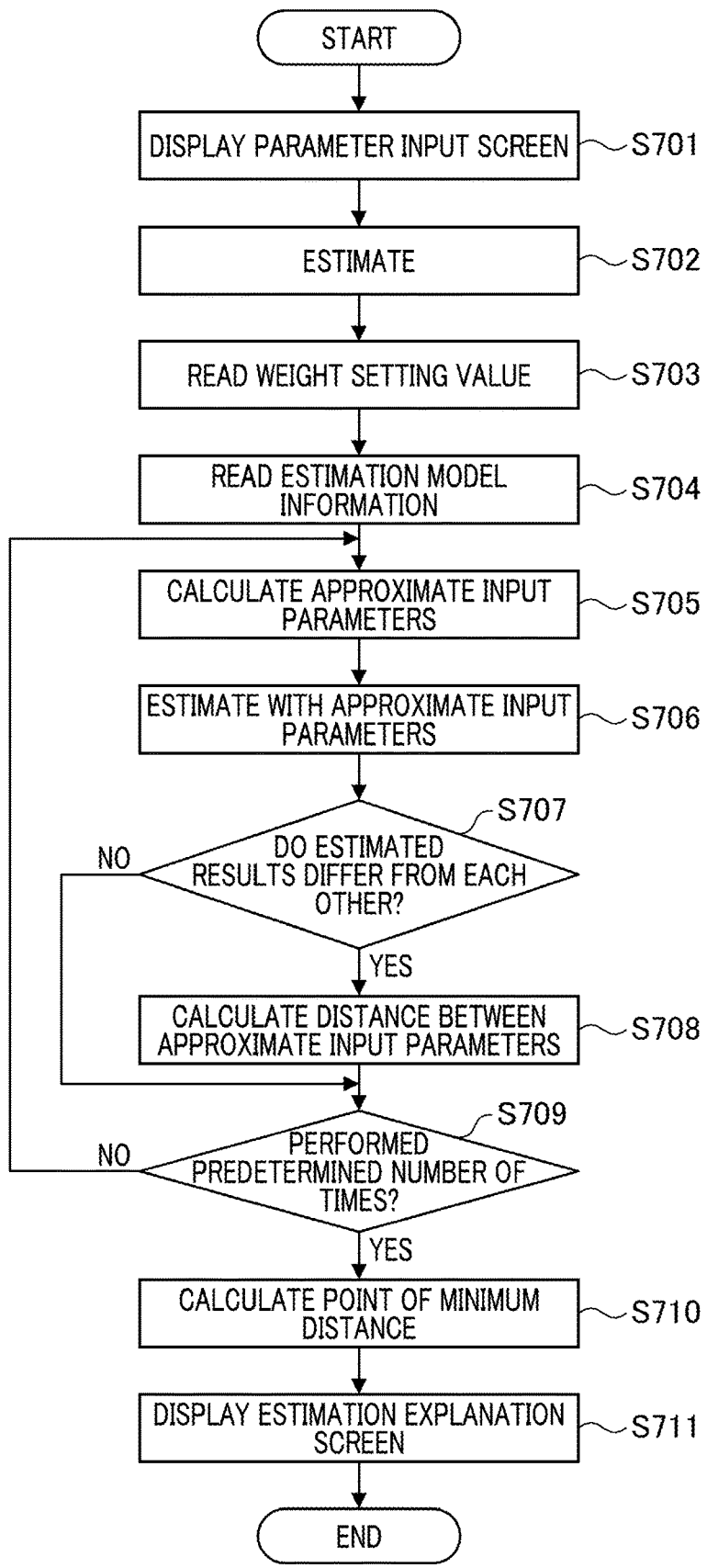
FIG. 7 is a flowchart illustrating a flow of an explanation result displaying process according to Example 1 of the present invention.

FIG. 7 is a flowchart illustrating a flow of an explanation result displaying process according to Example 1 of the present invention.

First, when the user operates the terminal 103 to display the input screen, the transaction inputting unit 313 receives the operation and displays a UI for inputting parameters necessary for estimation on the terminal 103 (step S701). The display screen is illustrated in FIG. 8.

FIG. 8 is a diagram illustrating a UI of a parameter inputting screen according to Example 1 of the present invention. The parameter input screen of FIG. 8 is a screen displayed on the terminal 103 and a screen used to prompt the user to input items generally necessary for a loan examination. On the screen of FIG. 8, the user can input an expected borrowing amount or an income of a loan applicant in addition to, for example, general information such as a name and an address. After the user completes the input on the screen of FIG. 8, the user operates an estimation execution button 801 (for example, clicks a mouse). The terminal 103 transmits content input by the user on the screen of FIG. 8 to the transaction inputting unit 313 in response to the operation of the estimation execution button 801.

When the content input on the screen of FIG. 8 is received from the terminal 103, the transaction inputting unit 313 requests the estimation unit 302 to perform estimation. The estimation unit 302 performs the estimation using the estimation model stored in the estimation model storage unit 303 (step S702) and delivers an estimated result to the transaction inputting unit 313. The transaction inputting unit 313 receives the estimated result from the estimation unit 302. Further, the transaction inputting unit 313 stores the received estimated result along with the content input on the screen of FIG. 8 in a memory such as the RAM 202.

Table 3 is a table that shows an example of content of data stored in the memory by the transaction inputting unit 313.

TABLE 3

| Name | Sex | Age | Estimated borrowing amount | Income | Savings | Other company borrowing amount | Educational background | Estimated result |
|---|---|---|---|---|---|---|---|---|
| Yamada Taro | ... Male | 30 | 10000000 | 3000000 | 500000 | 30000000 | University degree | Denied |
| Yamada Hanako | ... Female | 24 | 20000000 | 10000000 | 100000000 | 0 | Postgraduate degree | Approved |
| Yamada Jiro | ... Male | 24 | 20000000 | 10000000 | 100000000 | 0 | Postgraduate degree | Approved |

In Table 3, the estimated result is an estimated result output by the estimation unit 302 and is an estimated result for a given input.

Subsequently, the explanation generation unit 314 reads the weight setting value stored in the weight setting retention unit 312 and loads the weight setting value on a memory such as the RAM 202 (step S703). Further, the explanation generation unit 314 reads information regarding the estimation model stored in the estimation model information storage unit 304 and loads the information on a memory such as the RAM 202 (step S704).

Subsequently, the explanation generation unit 314 sets the content input on the screen of FIG. 8 and received from the terminal 103 in step S701 as input parameters and performs a process of generating an explanation of the estimated result for the input parameters. First, the explanation generation unit 314 determines which input parameter is changed in step S705. Specifically, the explanation generation unit 314 selects a predetermined number of parameters at random from the list of the input parameters of the estimation model read in step S704. Further, the explanation generation unit 314 changes the values of the selected parameters at random to generate approximate input parameters. Specifically, when the type of selected parameter in Table 1 is a category, the explanation generation unit 314 selects one of the elements at random among the elements (male or female in the first row of Table 1) of the category of the parameters and sets the element as the value of the parameter. When the type of selected parameter in Table 1 is a number, the explanation generation unit 314 sets a value obtained at random from a range of an average±a standard deviation×3 of the parameter as the value of the parameter. The range in which the value is obtained at random may be determined according to a percentage of the total included in the range.

Subsequently, the explanation generation unit 314 delivers the approximate input parameters generated in step S705 to the estimation unit 302. The estimation unit 302 receiving the approximate input parameters from the explanation generation unit 314 performs an estimation process using the received approximate input parameters as input parameters (step S706). Subsequently, the explanation generation unit 314 checks whether the estimated result estimated in step S706 differs from the estimated result estimated in step S702 (step S707).

In step S707, when the estimated result of step S706 is the same as the estimated result of step S702, the explanation generation unit 314 skips a distance calculation process of step S708 and the process proceeds to step S709. In this case, because the estimated result is not changed, the approximate input parameters used in step S706 are parameters which are not appropriate for the explanation.

In step S707, when the estimated result of step S706 differs from the estimated result of step S702, the explanation generation unit 314 causes the process to proceed to the distance calculation process of step S708. In step S708, the explanation generation unit 314 calculates a distance between the input parameter used for the estimation of step S702 and the approximate input parameter which is the input parameter used for the estimation of step S706.

Hereinafter, a distance calculation method in step S708 will be described. The distance is an index indicating how easy or difficult it is for two input parameters to change. Two input parameters at a close distance are two input parameters between which it is easy to change mutually. Conversely, two input parameters at a far distance are two parameters between which it is difficult to change, that is, parameters which are not appropriate for an explanation. The explanation generation unit 314 calculates a distance D (X, Y) between two input parameters according to Expression 1 below.

$$D(X, Y) = \sum_{k \in V} d_{W_k}(X_k, Y_k) \quad \text{[Expression 1]}$$

In Expression 1, the variable X indicates an input parameter (an input parameter used for the estimation of step S702) input by the user. The variable Y indicates the approximate input parameter (the input parameter used for the estimation of step S706) generated in step S705. A function d indicates a distance of each individual input parameter. A set V indicates all the input parameters which the estimation model acquired in step S704 has. A set W indicates a type of weight acquired in step S703 and set with the input parameter.

The explanation generation unit 314 calculates a distance between the input parameters x and y according to Expression 2 and Expression 3 below when no weight is set in the input parameters. Expression 2 is an expression for when the type of input parameters x and y is a number. Expression 3 is an expression for when the type of input parameters x and y is a category. In Expression 2, σ indicates a standard deviation of the input parameters acquired in step S704.

$$d_{Not\ set}(x, y) = \frac{(x - y)^2}{\sigma_k^2} \quad \text{[Expression 2]}$$

$$d_{Not\ set}(x, y) = \begin{cases} 0 & (x = y) \\ 1 & (x \neq y) \end{cases} \quad \text{[Expression 3]}$$

When the weight setting (the type of Table 2) of the input parameters acquired in step S703 is "Not changed," the explanation generation unit 314 calculates the distance between the input parameters x and y according to Expression 4 below.

$$d_{Not\ changed}(x, y) = \begin{cases} 0 & (x = y) \\ \infty & (x \neq y) \end{cases} \quad \text{[Expression 4]}$$

When the weight setting (the type of Table 2) of the input parameters acquired in step S703 is "designated with width," the explanation generation unit 314 calculates the distance between the input parameters x and y according to Expression 5 below. In Expression 5, a is a value of "from" stored in the weight setting retention unit 312 in step S503 (the value of "from" in a column of the value in Table 2). In Expression 5, b is a value of "to" stored in the weight setting retention unit 312 in step S503 (the value of "to" in a column of the value in Table 2).

$$d_{Designated\ with\ width}(x, y) = \begin{cases} d_{Not\ set}(x, y) & (a \leq y - x \leq b) \\ \infty & (y - x < a, b < y - x) \end{cases} \quad \text{[Expression 5]}$$

When the weight setting (the type of Table 2) of the input parameters acquired in step S703 is "Setting with weight," the explanation generation unit 314 calculates the distance between the input parameters x and y according to Expression 6 below. In Expression 6, w is a value of a weight stored in the weight setting retention unit 312 in step S503 (the value of "weight" in a column of the value in Table 2).

$$d_{Set\ with\ weight}(x,y) d_{Not\ set}(x,y) w \quad \text{[Expression 6]}$$

When the weight setting (the type of Table 2) of the input parameters acquired in step S703 is "Setting by comparison," the explanation generation unit 314 calculates the distance between the input parameters x and y according to Expression 7 below. In Expression 7, c is a value of "comp" stored in the weight setting retention unit 312 in step S503 (the value of "comp" in a column of the value in Table 2). In Expression 7, v is a value of "value" stored in the weight setting retention unit 312 in step S503 (the value of "value" in a column of the value in Table 2).

$$d_{Set\ by\ comparison}(x, y) = \frac{(x - y)^2}{(\sigma_c/v)^2} \quad \text{[Expression 7]}$$

Subsequently, the explanation generation unit 314 checks whether the calculation process is performed a predetermined number of times (step S709). The predetermined number of times indicates a sufficient number of searches necessary to search an input parameter space. When the calculation process is not performed the predetermined number of times, the process returns to step S705 and the explanation generation unit 314 calculates and evaluates new parameters. When the calculation process is performed the predetermined number of times, the explanation generation unit 314 determines the input parameters of which a distance is the minimum among the distances calculated in step S708 (step S710). Finally, the explanation generation unit 314 provides a UI (e.g. a display screen) for presenting the input parameters determined in step S710 as an explanation result to the user on the terminal 103 receiving the input parameters in step S701 (step S711). The display screen is illustrated in FIG. 9.

Figure 9:
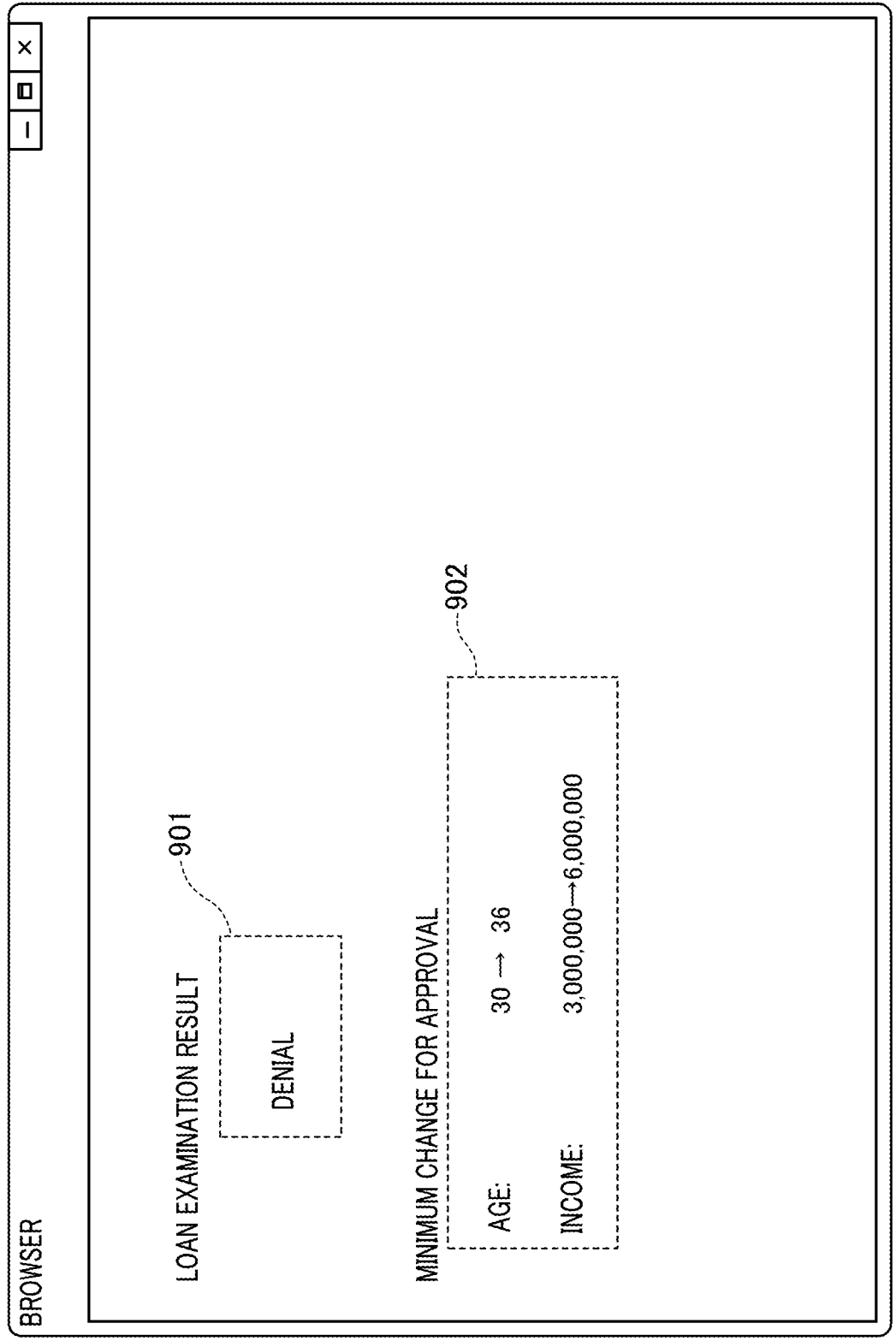
FIG. 9 is a diagram illustrating a UI of an explanation result displaying screen according to Example 1 of the present invention.

FIG. 9 is a diagram illustrating a UI of an explanation result displaying screen according to Example 1 of the present invention. The explanation result displaying screen of FIG. 9 is a screen displayed on the terminal 103 and used to present an explanation result to the user. The terminal 103 displays an estimated result 901 and an explanation region 902 on the screen of FIG. 9. The terminal 103 displays the estimated result acquired in step S702 by the estimation unit 302 in the estimated result 901. The terminal 103 displays the changed input parameters determined in step S710 in the explanation region 902. Since the user can know whether the estimated result is changed by changing a certain input parameter with reference to display content of the explanation region 902, the user can easily understand the estimated result of the machine learning. The display example of FIG. 9 shows that the current loan examination result is a denial, but when the age of the applicant is from current 30 years old to 36 years old and an income of the applicant is from current 3 million yen to 6 million yen, an examination result is an approval.

The display content of the explanation region 902 is an example of information indicating the changed content of the parameters necessary to change the estimated result.

In the screen example of FIG. 9, visibility is improved by displaying only the input parameters after the change among the plurality of input parameters used for the estimation. Further, in the screen example of FIG. 9, the user can understand the estimated result of the machine learning more easily when the values of the input parameters before the change are also displayed along with the input parameters after the change. Further, the display content of the explanation region 902 of FIG. 9 is an example of information necessary to change the estimated result among the plurality of input parameters used for the estimation. The UI of FIG. 9 and the explanation generation unit 314 are examples for provide mechanism providing information necessary to change the estimated result. The weight set by the weight setting unit 311 is an example of a condition when the provide mechanism provides information. The UI of FIG. 6 and the weight setting unit 311 are examples of setting mechanisms setting conditions when the provide mechanism provides information.

As described above, according to Example 1 of the present invention, by displaying the input parameters which are at the minimum distance after the weight by the user is considered, it is possible to present the input parameters that reflect an intention of the user. Thus, the user can understand the estimated result of the machine learning more easily, and thus an explanation responsibility capability of machine learning can be improved in the system.

In this example, a distance function is defined as a sum of distance functions of the input parameters, but the present invention is not limited thereto. For example, the distance function may be calculated according to Expression 8 below. In Expression 8, $\Omega(X, Y)$ indicates the number of parameters that have different values between the input parameters and the approximate input parameters.

$$D(X, Y) = \sum_{k \in V} d_{w_k}(X_k, Y_k) + \Omega(X, Y) \qquad \text{[Expression 8]}$$

By defining the distance function expressed in Expression 8, a distance is further when there are more different values between the input parameters and the approximate input parameters. Therefore, since the number of input parameters determined in step S710 which are different between the approximate input parameters and the input parameters is small, an explanation in which a change in the input parameters is less can be generated. In the example of FIG. 9, in order to change an examination result (the estimated result), it is necessary to change two input parameters of age and income. In the example in which the expression of Expression 8 is used, the distance is closer as the number of the changed input parameters is less. Therefore, the types of input parameters displayed in the explanation region 902 of FIG. 9 can be reduced, and thus information which is easy to explain to the loan applicant can be provided to the user.

For example, in this example, when there are a plurality of patterns as change patterns of the input parameters for changing the estimated result, information regarding the patterns other than the patterns in which the distance is the closest (information regarding some of the plurality of patterns) is not provided to the user.

Example 2

In Example 1, the case in which the weight setting value is set for each input parameter has been described. In Example 2, an example in which a plurality of weights can be provided for each input parameter will be described.

A case in which age is a parameter can be considered as an example. The parameter of age is the same for young people and older people, but there is a possibility of a feeling being different between a case in which young people wait for 5 years and a case in which older people wait for 5 years. In Example 1, these are treated in the same way. In Example 2, however, these are treated in different modes, and thus more detailed control can be performed and it can be easier to explain an estimated result of machine learning. In the description of Example 2, the detailed description of the same content as that of Example 1 will be omitted by using the same reference numerals in the drawings used to describe Example 1.

Figure 10:
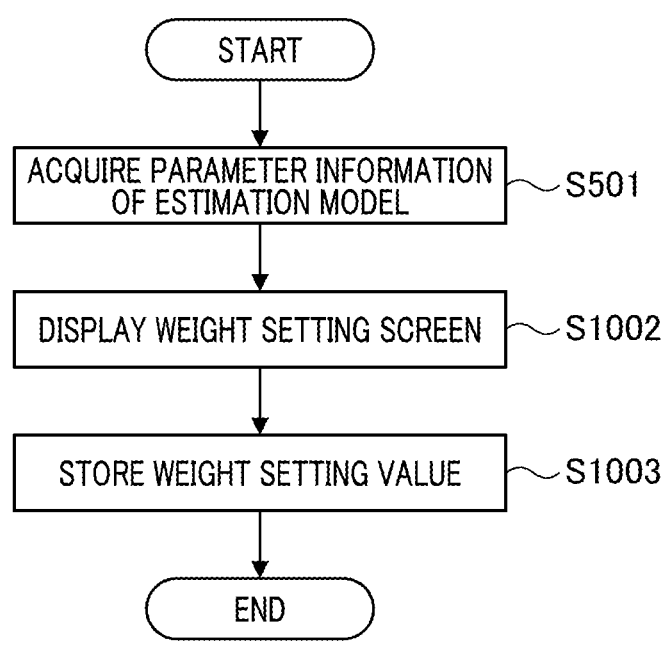
FIG. 10 is a flowchart illustrating a flow of a weight setting process according to Example 2 of the present invention.

FIG. 10 is a flowchart illustrating a flow of a weight setting process according to Example 2 of the present invention.

First, when the user operates the terminal 103 to display a setting screen, the weight setting unit 311 receives the operation and acquires input parameter information of the estimation model stored in the estimation model information storage unit 304 (step S501). Thereafter, the weight setting unit 311 displays a UI for setting a weight on the terminal 103 operated to display the setting screen (step S1002). The display screen is illustrated in FIG. 11.

Figure 11:
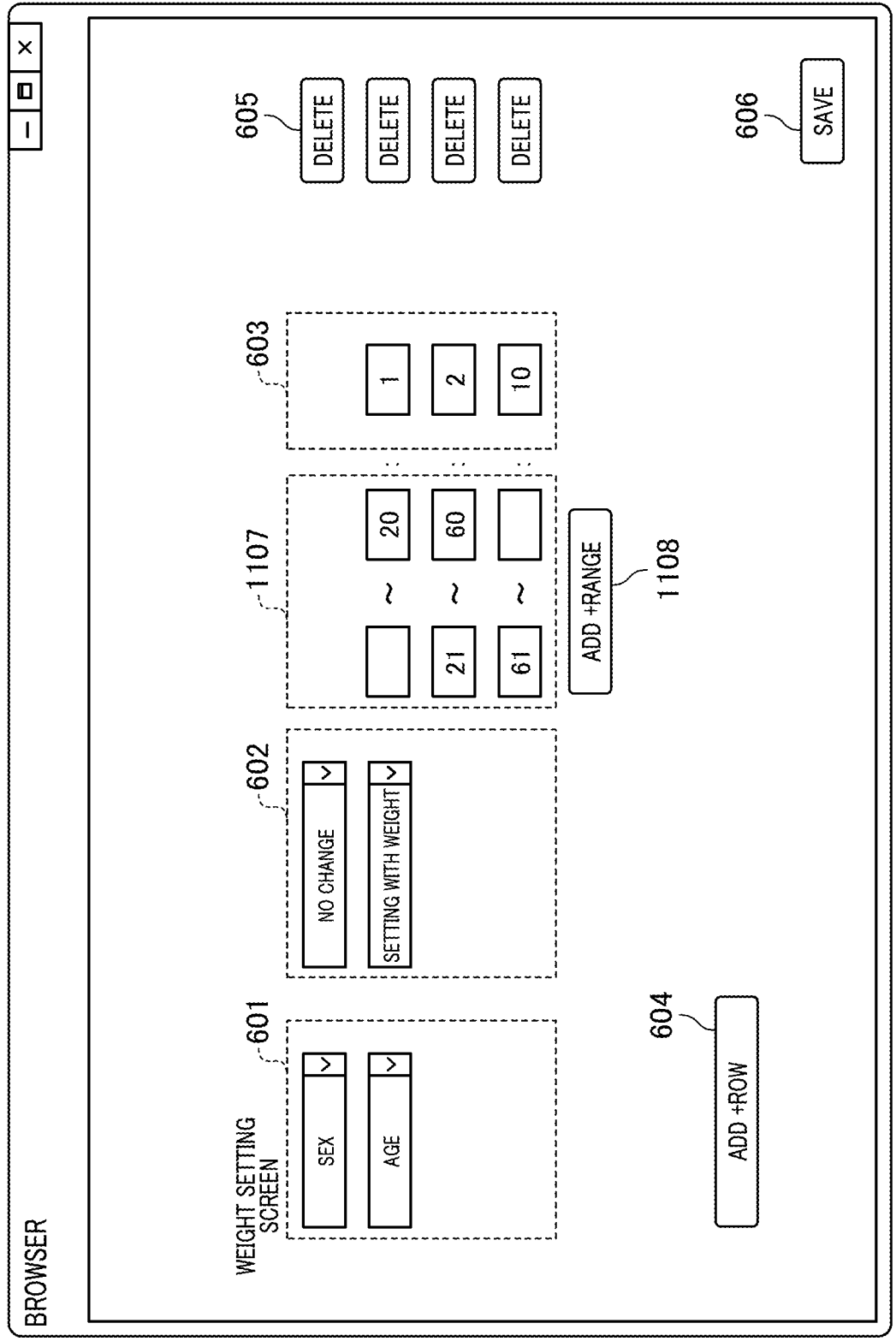
FIG. 11 is a diagram illustrating a UI of a weight setting screen according to Example 2 of the present invention.

FIG. 11 is a diagram illustrating a UI of a weight setting screen according to Example 2 of the present invention. On the weight setting screen of FIG. 11, a range setting 1107 for each input parameter and a button 1108 are displayed in addition to the explanation with reference to the weight setting screen of FIG. 6. The range setting 1107 receives setting of a weight that differs in accordance with a value of the input parameter. In the example of FIG. 11, for the input parameter of "Age," a weight parameter of "Setting with weight" is set and a magnification of the input 603 in "age" equal to or less than 20 is set to 1. In the example of FIG. 11, for the input parameter of "Age," a magnification of the input 603 is set to 2 in "Age" equal to or greater than 21 and equal to or less than 60. Further, in the example of FIG. 11, for the input parameter of "Age," a magnification of the input 603 is set to 10 in "Age" equal to or greater than 61. When age is set as in FIG. 11, 1 is set as a magnification of the weight in the age in the range of $-\infty$ to 20 years old, 2 is set as a magnification of the weight in the age in the range of 21 years old to 60 years old, and 10 is set as a magnification of the weight in the age in the range of 61 to +∞ years old. Thus, in this example, the weight can be set to be applied in accordance with the age of a loan applicant.

In the range setting 1107, the setting is an example of a case in which a range of the input parameter is divided into a plurality of ranges and a condition (for example, a magnification of a weight) that differs for each of the divided ranges is set.

In the example of FIG. 11, when "Setting with weight" is selected in the drop-down 602, setting can be performed for each range of the range setting 1107 and the input 603, but the present invention is not limited thereto. Even when another option is selected in the drop-down 602, the setting may be performed for each range of the range setting 1107 and the input 603.

The weight parameter set in the input 603 can be set for each range set in the range setting 1107. When the user operates the button 1108 (clicks a mouse, for example), a range which can be set in the range setting 1107 can be increased. When the user operates the button 605 (clicks a mouse, for example), a range corresponding to the operated button 605 can be deleted as a setting target.

When the user operates a save button 606 (clicks a mouse, for example), the weight setting unit 311 receiving the operation saves a weight setting value input on the UI of FIG. 11 in the weight setting retention unit 312 (step S1003).

Table 4 is a table that shows an example of content of data saved in the weight setting retention unit 312 by the weight setting unit 311 in step S1003.

TABLE 4

| Id | Variable | Type | Range | Value |
|---|---|---|---|---|
| cond11 | Sex | No change | | |
| cond12 | Age | Setting with weight | −∞ to 20 | ("weight": 1) |
| cond13 | Age | Setting with weight | 21 to 60 | ("weight": 2) |
| cond14 | Age | Setting with weight | 61 to +∞ | ("weight": 10) |
| cond15 | Sex | Setting with weight | Male | ("weight": 5) |
| cond16 | Sex | Setting with weight | Female | ("weight": 3) |

In Table 4, a range indicates a value set in the range setting 1107 by the user. When the type of input parameter is a category, a weight setting is assigned for each individual category.

Figure 12:
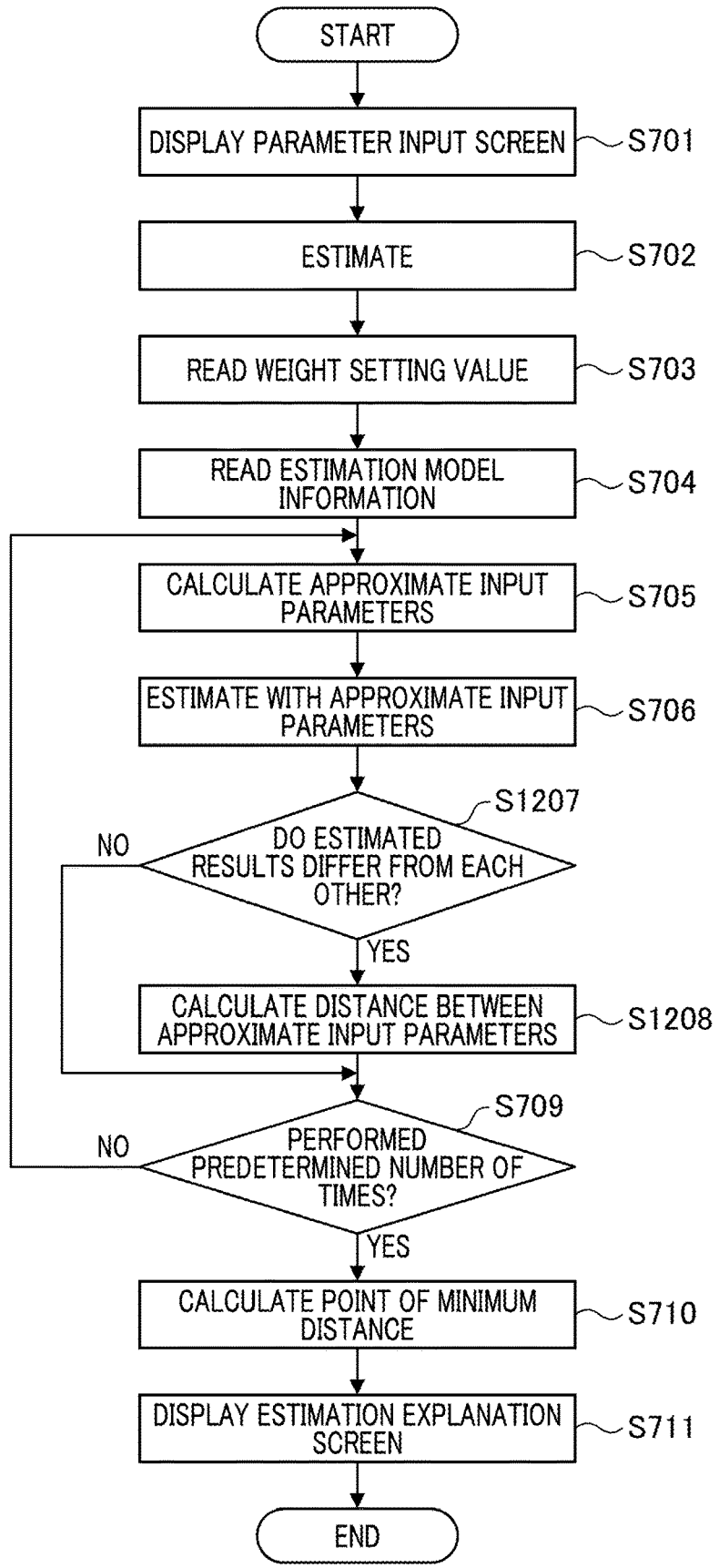
FIG. 12 is a flowchart illustrating a flow of an explanation result displaying process according to Example 2 of the present invention.

FIG. 12 is a flowchart illustrating a flow of an explanation result displaying process according to Example 2 of the present invention. Since the process from steps S701 to S706 in FIG. 12 is the same process as the process from steps S701 to S706 in FIG. 7, description thereof will be omitted. Since the process from steps S709 to S711 in FIG. 12 is the same as the process from steps S709 to S711 in FIG. 7, description thereof will be omitted.

In step S1207 continuing from step S706, the explanation generation unit 314 checks whether the estimated result estimated in step S706 differs from the estimated result estimated in step S702.

In step S1207, when the estimated result of step S706 is the same as the estimated result of step S702, the explanation generation unit 314 skips a distance calculation process of step S1208 and the process proceeds to step S709. In this case, since the estimated result is not changed, the approximate input parameters used in step S706 are parameters which are not appropriate for the explanation.

When the estimated result of step S706 differs from the estimated result of step S702 in step S1207, the explanation generation unit 314 causes the process to proceed to the distance calculation process of step S1208. In step S1208, the explanation generation unit 314 calculates a distance between the input parameter used for the estimation of step S702 and the approximate input parameter which is the input parameter used for the estimation of step S706.

Hereinafter, a distance calculation method in step S1208 will be described. A distance calculation function is the same as that of the process of step S708 except for a portion in which the parameter of the weight is given. Therefore, differences will be described herein. When a plurality of weights are set in the input parameter, the weight parameter is used as a function of the input parameter x. When only a single weight is set, the weight parameter is used as a common value irrespective of the input parameter x.

When the weight setting (the type of Table 4) of the input parameters acquired in step S703 is "Setting with weight," the explanation generation unit 314 calculates the distance between the input parameters x and y according to Expression 9 below.

$$d_{Set\ with\ weight}(x,y) = d_{Not\ set}(x,y) w_x \quad \text{[Expression 9]}$$

In Expression 9, w indicates a value of a weight changed with the input parameter x. As an example, when the weight of Table 4 is set and the input parameter is age, $w_x$ is expressed by Expression 10.

$$w_x = \begin{cases} 1 (x \le 20) \\ 2 (21 \le x \le 60) \\ 10 (x \ge 61) \end{cases} \quad \text{[Expression 10]}$$

When the weight setting (the type of Table 4) of the input parameters acquired in step S703 is "Setting with width," the explanation generation unit 314 calculates the distance between the input parameters x and y according to Expression 11 below.

$$d_{Designated\ with\ width}(x, y) = \begin{cases} d_{Not\ set}(x, y) & (a \le y - x \le b_x) \\ \infty & (y - x < a_x,\ b_x < y - x) \end{cases} \quad \text{[Expression 11]}$$

In Expression 11, a is a value of "from" stored in the weight setting retention unit 312 in step S503. In Expression 11, b is a value of "to" stored in the weight setting retention unit 312 in step S503.

When the weight setting (the type of Table 4) of the input parameters acquired in step S703 is "Setting by comparison," the explanation generation unit 314 calculates the distance between the input parameters x and y according to Expression 12 below.

$$d_{Set\ by\ comparison}(x, y) = \frac{(x - y)^2}{(\sigma_{c_x}/v_x)^2} \quad \text{[Expression 12]}$$

In Expression 12, c is a value of comp stored in the weight setting retention unit 312 in step S503. In Expression 12, v is a value of "value" stored in the weight setting retention unit 312 in step S503.

As described above, in Example 2 of the present invention, by setting the weight parameter so that the weight parameter is changed in accordance with the input parameter, it is possible to perform more detailed control. Thus, an explanation responsibility capability of the estimated result of machine learning is improved in the system.

Preferred embodiments of the present invention have been described, but the present invention is not limited to these embodiments and various modifications and changes can be made within the scope of the gist of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-161015, filed Sep. 4, 2019, which is hereby incorporated by reference wherein in its entirety.

What is claimed is:

1. A system that provides an estimated result using a learning model, the system comprising:
   a memory storing instructions; and
   a processor that is capable of executing the instructions stored in the memory causing the system to:
   set a condition with regard to at least one parameter among a plurality of parameters, the set condition limiting a change of an input value of the at least one parameter in a case where the input value of the at least one parameter is changeable to change the estimated result provided using the learning model;
   execute an estimation using the learning model based on respective input values corresponding to the plurality of parameters; and
   provide the estimated result of the executed estimation and information necessary to change the estimated result,
   wherein the provided information necessary to change the estimated result indicates a change of the input value of the at least one parameter that will change the estimated result provided using the learning model and that is not limited according to the set condition,
   wherein, as the set condition, respective weights for a plurality of category elements of at least one parameter among the plurality of parameters are designated, and the plurality of category elements are used for categorizing a user corresponding to the input values associated with the plurality of parameters, and
   wherein the respective weights indicate, in changing the estimated result, comparative easiness of a change of value for another parameter among the plurality of parameters.

2. The system according to claim 1, wherein, as the set condition, a parameter not used to change the estimated result is selected from among the plurality of parameters.

3. The system according to claim 1, wherein, as the set condition, a value range for one parameter among the plurality of parameters is designated to change the estimated result.

4. The system according to claim 1, wherein, as the set condition, a value of one parameter among the plurality of parameters to be changed with respect to one of a value of another parameter in changing the estimated result is designated.

5. The system according to claim 1, wherein
   the estimated result is a two-class classification result, and
   the estimated result is provided with the information necessary to change the estimated result from one class of the two-class classification result to the other class of the two-class classification result.

6. A method performed in a system that provides an estimated result using a learning model, the method comprising:
   setting a condition with regard to at least one parameter among a plurality of parameters, the set condition limiting a change of an input value of the at least one parameter in a case where the input value of the at least one parameter is changeable to change the estimated result provided using the learning model;
   executing an estimation using the learning model based on respective input values corresponding to the plurality of parameters; and
   providing the estimated result of the executed estimation and information necessary to change the estimated result,
   wherein the provided information necessary to change the estimated result indicates a change of the input value of the at least one parameter that will change the estimated result provided using the learning model and that is not limited according to the set condition,
   wherein, as the set condition, respective weights for a plurality of category elements of at least one parameter among the plurality of parameters are designated, and the plurality of category elements are used for categorizing a user corresponding to the input values associated with the plurality of parameters, and
   wherein the respective weights indicate, in changing the estimated result, comparative easiness of a change of value for another parameter among the plurality of parameters.

7. A non-transitory recording medium storing a control program causing a system to perform each step of a control method of the system, the control method being performed by the system to provide an estimated result using a learning model, the control method comprising:

setting a condition with regard to at least one parameter among a plurality of parameters, the set condition limiting a change of an input value of the at least one parameter in a case where the input value of the at least one parameter is changeable to change the estimated result provided using the learning model;

executing an estimation using the learning model based on respective input values corresponding to the plurality of parameters; and providing the estimated result of the executed estimation and information necessary to change the estimated result, wherein the provided information necessary to change the estimated result indicates a change of the input value of the at least one parameter that will change the estimated result provided using the learning model and that is not limited according to the set condition, wherein, as the set condition, respective weights for a plurality of category elements of at least one parameter among the plurality of parameters are designated, and the plurality of category elements are used for categorizing a user corresponding to the input values associated with the plurality of parameters, and wherein the respective weights indicate, in changing the estimated result, comparative easiness of a change of value for another parameter among the plurality of parameters.

* * * * *